United States Patent

[11] 3,626,793

| [72] | Inventor | Kenneth A. Rice<br>Waukegan, Ill. |
|---|---|---|
| [21] | Appl. No. | 854,707 |
| [22] | Filed | Sept. 2, 1969 |
| [45] | Patented | Dec. 14, 1971 |
| [73] | Assignee | Ammco Tools, Inc.<br>North Chicago, Ill. |

[54] BRAKE DISC SURFACER
3 Claims, 5 Drawing Figs.

[52] U.S. Cl. ................................................. 82/36, 82/4 A
[51] Int. Cl. ....................................................... B23b 29/26
[50] Field of Search ........................................... 82/4.1, 2, 36; 77/58 A–58 D, 56, 57

[56] References Cited
UNITED STATES PATENTS

| 3,027,786 | 4/1962 | Severson | 77/58 |
| 3,088,141 | 5/1963 | Tansey | 77/58 X |
| 3,274,861 | 9/1966 | Czubak | 77/58 |
| 3,442,164 | 5/1969 | Blazek | 82/2 |
| 3,187,406 | 6/1965 | Franko | 29/95 |
| 3,341,920 | 9/1967 | Kelm | 29/96 |

FOREIGN PATENTS

| 214,744 | 4/1961 | Austria | 77/58.31 |
| 1,378,424 | 10/1964 | France | 82/4 A |

*Primary Examiner*—Leonidas Vlachos
*Attorney*—Fidler, Bradley, Patnaude & Lazo

ABSTRACT: A brake disc surfacer includes a pair of tool support bar assemblies arranged on opposite sides of a rotatable brake disc so as to simultaneously remove metal from both faces of the disc. Thin, triangular cutting bits are respectively mounted on the end of each assembly so that 12 usable cutting edges are provided on each bit.

Patented Dec. 14, 1971
3,626,793
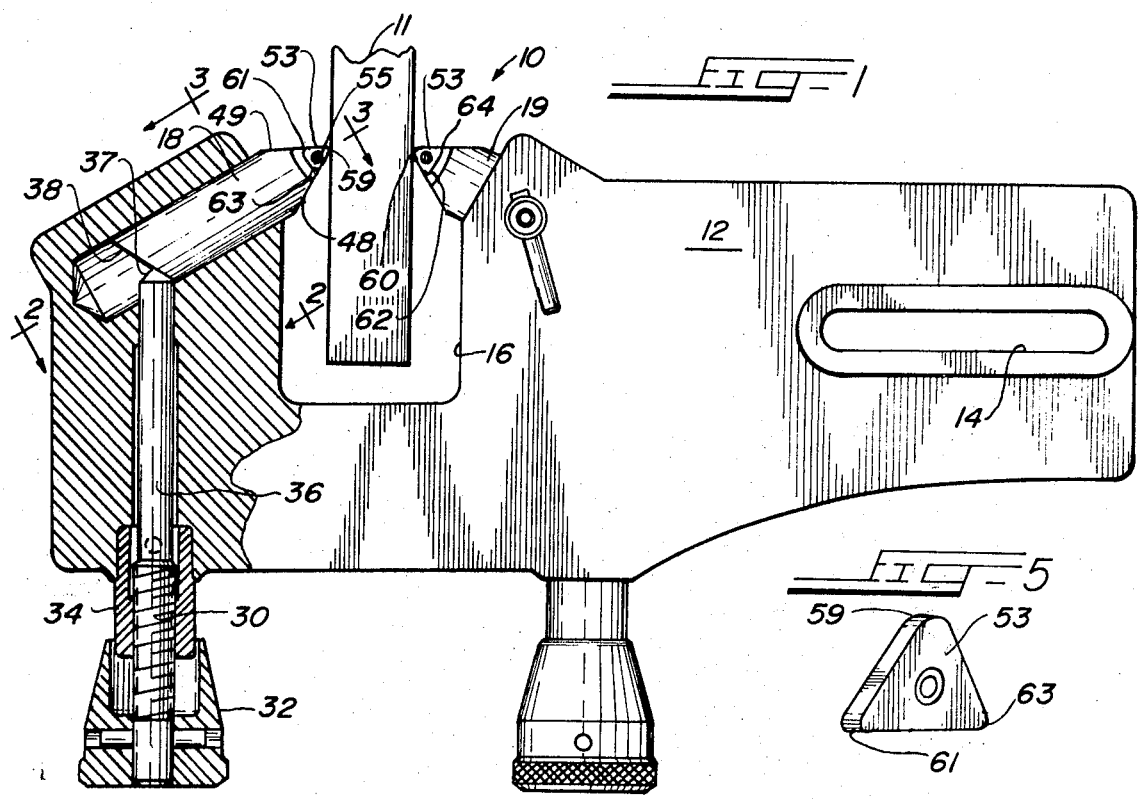
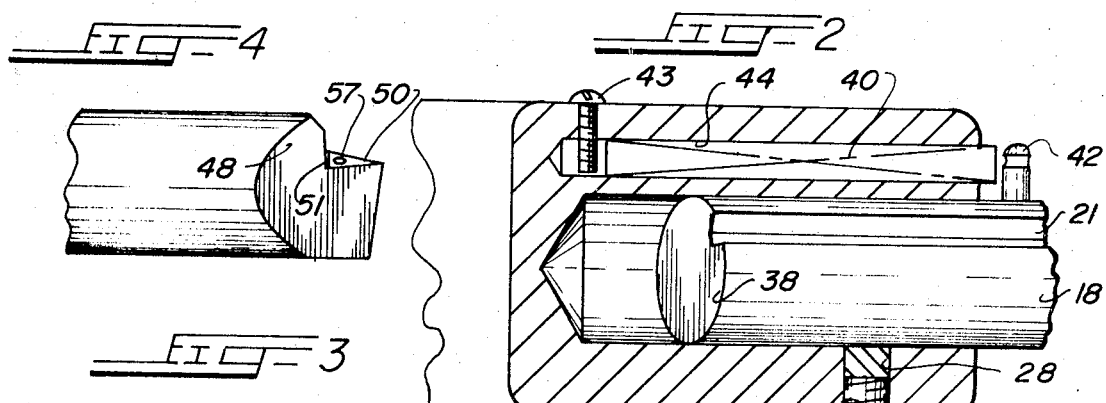
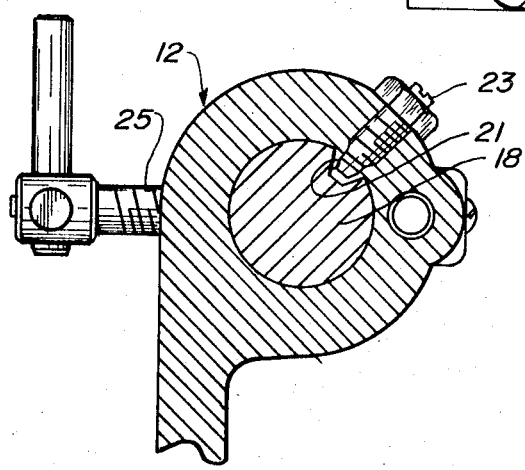
INVENTOR.
KENNETH A. RICE.

BRAKE DISC SURFACER

The present invention generally relates to the art of metal cutting, and it relates more particularly to a tool support bar assembly for simultaneously removing metal from both faces of a brake disc or the like.

Thin triangular cutting elements or bits have been used for many years and are readily available on the market. It would, therefore, be desireable to provide a tool which uses such triangular tool bits to best advantage in the resurfacing of brake discs. Inasmuch as brake discs are relatively thin, it would be further desirable if both faces thereof could be resurfaced simultaneously thereby to reduce vibration and provide more nearly precise planar surfaces on the finished disc while also reducing the time of the overall resurfacing operation.

A principal object of the present invention is, therefore, to provide a new and improved tool support bar assembly for removing material from a rotating workpiece.

Another object of the present invention is to provide a new and improved tool support bar assembly employing a pair of triangular cutting elements in such a manner as to utilize 12 different cutting edges on each cutting element.

A further object of the invention is to provide a novel tool support bar assembly for simultaneously cutting material from opposite faces of a rotating disc.

Briefly, the above and further objects may be realized in accordance with the present invention by providing a housing, a pair of bores disposed in the housing with their axes lying in a common plane and mutually intersecting at an obtuse angle, a pair of bars axially slidable in said bores at fixed angular positions, a pair of identical, thin equilaterally triangular cutting elements respectively mounted on the bars for engagement with a workpiece located between the bars, the cutting elements being positionable on each of the bars to provide six separate cutting edges and interchangeable between the bars to provide six additional cutting edges. Accordingly, 12 usable cutting edges are provided on each triangular cutting element.

The invention, both as to its organization and method of operation, together with further objects and advantages thereof will best be understood by reference to the following detailed description taken in connection with the accompanying drawings, wherein:

FIG. 1 is a plan view, partly broken away, of a tool support bar assembly embodying the present invention;

FIG. 2 is a sectional view taken along the line 2—2 of FIG. 1;

FIG. 3 is a sectional view taken along the line 3—3 of FIG. 1;

FIG. 4 is an enlarged, perspective view of a portion of a bar embodying the present invention; and FIG. 5 is an enlarged, perspective view of a triangular cutting element of the type used in the boring bar assembly of the present invention.

Referring now to the drawings and more particularly to FIG. 1 thereof, there is shown a tool support bar assembly 10 adapted to be attached to a lathe for resurfacing both faces of a brake disc 11 mounted on the spindle of the lathe and rotated relative to the boring bar assembly 10. As illustrated, the tool support bar assembly 10 includes a housing 12 provided with a suitable mounting slot 14 near one end and a recess 16 through which the workpiece 11 rotates. A pair of bars 18 and 19 are slidably supported within the housing 12 on opposite sides of the recess 16 for adjustable engagement with the opposite faces of the workpiece 11.

The bars 18 and 19 are mirror images of one another and, therefore, only the boring bar 18 is described in detail herein. As best shown in FIGS. 1 and 2, the bar 18 is generally cylindrical and includes a longitudinal slot 21, and a locating screw 23 which is threaded into a suitable bore in the housing and extends into the groove 21 thereby to prevent angular displacement of the bar 18 during axial adjustment thereof. A locking means in the form of a crossfeed locking screw 25 is threadedly received in an aperture 25 in the housing 12 and a friction plug 28 is mounted in the aperture 25 between the inner end of the screw 25 and the bar 18 so that as the screw 25 is tightened the plug 28 is forced into tight frictional engagement with the bar 18 thereby to hold it in a fixed position relative to the housing during the grinding operation.

In order to adjust the axial position of the bar 18 the locking screw 25 is loosened and an adjusting screw 30 having a knurled handle 32 thereon is threadedly received in a bushing 34 which is in turn press-fitted into a counterbore in the housing 12. A control rod 36 is pinned to the end of the screw 30 and has a conical inner end 37 which engages a planar rearward end 38 on the bar 18. The plane of the end 38 intersects the principal longitudinal axis of the bar 18 at an angle of about 60° so that as the rod 36 is rotated and moved axially inwardly, the conical surface 37 thereon cams the bar 18 in an outward axial direction. As best shown in FIG. 2, a tension spring 40 is positioned in a hole 41 in the housing 12 and is stretched between a pin 42 on the bar 18 and a screw 43 threaded through the housing into the hole 41 to hold the bar 18 against the rod 36 during adjustment thereof.

Referring more particularly to FIGS. 1 and 4, it may be seen that the bar 18 is generally cylindrical and is provided with a pair of end flats 48 and 49 which intersect at an angle of 60°. A planar triangular surface 50 of equilateral configuration is provided at the tapered end of the bar 18 and a slight relief 51 is provided at the inner end thereof to facilitate removal of a triangular tool bit 53. The tool bit 53, which is formed of hard tool metal such as a sintered metal, seats on the planar surface 50 and is held in place by a screw 55 threaded into a threaded bore 57 in the surface 50.

In use, the locking screws 25 for each of the bars 18 and 19 are loosened and the dial knobs 32 are rotated to adjust the axial positions of the bars 18 and 19 relative to the wheel disc 11 to make the proper depth of cut. With the axial positions of the bars 18 and 19 thus adjusted, the screws 25 are tightened and the lathe is operated to rotate the wheel disc 11 and to move the tool support bar assembly 18 in a direction parallel to the planar surfaces of the disc 11 thereby to remove a predetermined amount of surface material to resurface the brake disc. It may be seen that during the cutting operation, the edges 59 and 60 of the tool bits 53 provide the cutting edges. Once these edges 59 and 60 have been worn, the screws 55 may be loosened and removed and the tool bits 53 rotated through 120° to move the next cutting edges 61 and 62 into the operative cutting position. Again, when these edges have become worn, the cutting elements 53 may be rotated through 120° to move the cutting edges 63 and 64 have into the operative position. When these edges 63 and 64 have become worn, the discs may then be turned over on the same bar and used for three additional cutting edges on the opposite side. When these six edges have thus been used, the screws 55 may be removed again and the discs interchanged so that that disc 53 which was on the bar 18 is moved to the bar 19 and the disc from the bar 19 is moved to the bar 18. When this is done, an additional six cutting edges will be available for use. Accordingly, 12 cutting edges are obtainable from each of the triangular cutting elements resulting in a substantial savings in cost.

While the present invention has been described in connection with a particular embodiment thereof it will be understood that many changes and modifications may be made without departing from the true spirit and the scope of the present invention. It is intended, therefore, to cover all such changes and modifications in the appended claims.

What is claimed is:

1. A tool support bar assembly for use with a rotatable workpiece, comprising
   a housing having a workpiece clearing recess therein,
   a pair of bores disposed in said housing with the axes of said bores lying in a common plane and mutually intersecting at an obtuse angle,
   a pair of tool support bars which are mirror images of one another,
   each of said bars being axially slidable in a respective one of said bores, means for holding said bars at fixed angular positions in said bores, adjustable means for holding said bars at axially adjusted positions in said bores, a planar support surface on each of said bars, said support surfaces on said bars lying in a common plane and facing in the same direction, a shoulder on each of said bars extending perpendicular to the axis of the respective bar and lying adjacent to the respective one of said support surfaces, a pair of identical, thin, equilaterally triangular cutting elements respectively mounted on said support surfaces with one side edge of each said element abutting the respective one of said shoulders to angularly position said elements relative to a workpiece located between said boring bars, said cutting elements being positionable in six different positions on each of said boring bars to provide six separate cutting edges and interchangeable between said boring bars to provide six additional cutting edges, whereby 12 useable cutting edges are provided on each triangular cutting element, wherein said adjustable means comprises a pair of screws rotatable in said housing with the inner ends thereof extending respectively into said bores into abutment with the inner ends of said tool support bars, said inner ends of said tool support bars each being flat and lying in a plane which intersects the respective one of said axes at an angle of between 30° and 60° said inner ends of said screws being conical, and spring means urging said tool support bars against said conical ends of said screws.

2. A tool support bar assembly as set forth in claim 1 wherein said means for holding said bars at a fixed angular position comprises means on each of said bars defining a longitudinal groove, and a pair of guide members extending through said housing into said respective bores and into the longitudinal grooves in said bars to prevent rotation of said bars in said housing.

3. A tool support bar assembly according to claim 1 comprising a pair of locking screws threadedly mounted in said housing for holding said bars in fixed axial positions during a surfacing operation.

* * * * *